Oct. 23, 1962  D. J. POITRAS  3,060,368
PROTECTIVE CIRCUIT FOR A VOLTAGE REGULATOR
Filed Dec. 30, 1959
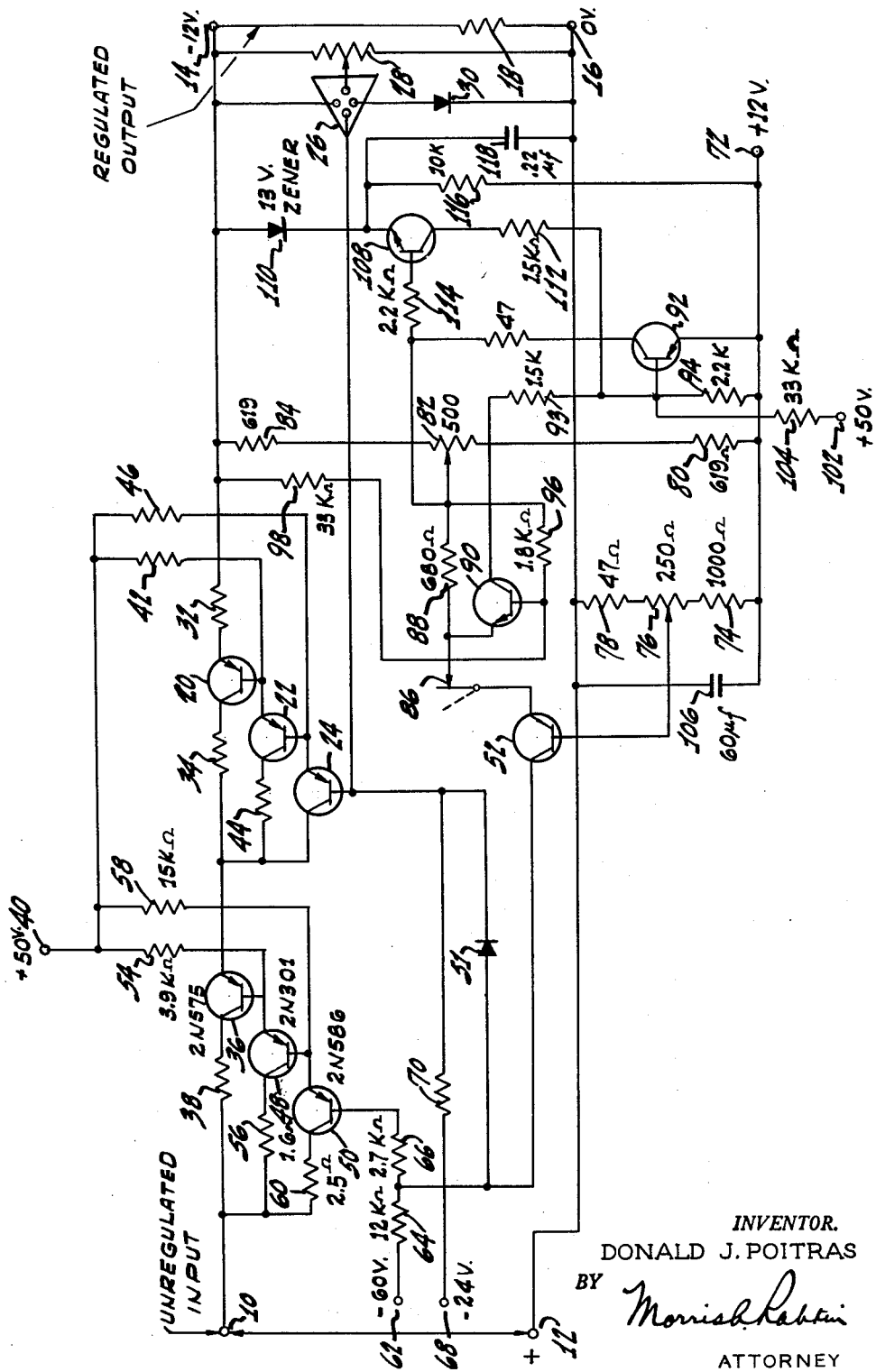
INVENTOR.
DONALD J. POITRAS
BY
ATTORNEY United States Patent Office 3,060,368
Patented Oct. 23, 1962

3,060,368
PROTECTIVE CIRCUIT FOR A VOLTAGE REGULATOR
Donald J. Poitras, Haddonfield, N.J., assignor to Radio Corporation of America, a corporation of Delaware
Filed Dec. 30, 1959, Ser. No. 863,035
7 Claims. (Cl. 323—22)

This invention relates generally to protective circuits for interrupting current in a circuit upon the occurrence of a fault, and more particularly to an improved protective circuit adapted for use in a regulated power supply. The protective circuit of the present invention is particularly useful in preventing damage to a load on the power supply due to an overvoltage, and in protecting the power supply, itself, if the load should become short-circuited.

In most conventional, regulated power supplies, the output voltage tends to rise when there is a fault in the regulating circuit of the power supply. A lack of regulation frequently causes the power supply to provide the load with an excessive current. This action may result in damage to the load, especially where transistors are used. It has been proposed to protect regulated, transistorized power supplies by causing the series, pass transistor of the regulated power supply to become reverse biased, and thereby to cease conducting, upon the occurrence of a short-circuit in the load on the power supply. While this means of protection is adequate for some applications, it will not furnish any protection to the load or to the power supply if the series, pass transistor becomes short-circuited internally (that is, the transistor assumes a relatively low resistance), as is sometimes the case when a transistor is caused to conduct excessively. It has also been proposed to protect the transistors of a regulated power supply by a protective circuit that shunts a large portion of the current around the transistors, in the event of an overvoltage. This latter means of protection requires relatively expensive transistors having large current-carrying capacities and high power dissipation characteristics.

Accordingly, it is an object of the present invention to provide a novel protective circuit that overcomes the aforementioned disadvantages of the prior art in protecting a load from an overvoltage, and in protecting the power supply from being damaged by a short-circuit in the load.

Another object of the present invention is to provide an improved protective circuit for a transistorized power supply that completely cuts off current to the load in the event of an overvoltage produced by the power supply, or in the event of a short-circuit in the load on the power supply.

Still another object of the present invention is to provide an improved protective circuit for transistorized, regulated power supplies having a series, pass transistor, which circuit will protect the power supply in the case of a short-circuit in the load or an overvoltage of the power supply, event if the series, pass transistor has been short-circuited.

A further object of the present invention is to provide an improved protective circuit, for a power supply, that is relatively simple in structure, very reliable in operation, and highly efficient in use.

In accordance with the present invention, the improved protective circuit is adapted for use in a regulated power supply wherein regulation is obtained by feeding back a sample of the output voltage degeneratively to the control electrode of a variable impedance device. The variable impedance device may be a series, pass transistor that is connected between the source of unregulated voltage and the load. A switching device, such as a switching transistor, is connected in series with the series, pass transistor and the source of unregulated voltage so that current to the load passes through both the switching transistor and the series, pass transistor. Under conditions of normal operation of the power supply, both the switching transistor and the series, pass transistor are biased in a forward direction, that is, in a current conducting state. The protective circuit comprises one or more transistors that are biased to cut off under conditions of normal operation of the power supply. These transistors are biased from an independent source of voltage that is connected to the regulating circuit.

Means are provided to sense the output voltage for an overvoltage of, or a short-circuit across, the power supply. Upon the occurrence of an overvoltage or a short-circuit across the power supply, the transistors of the protective circuit are made conductive, and a voltage from the independent source of voltage is applied, through one of the transistors of the protective circuit, to the control electrodes of the serially connected switching transistor and the series, pass transistor. This action reverse biases both of these transistors, thereby causing them to cease conducting. This action also cuts off current to the load completely. The power supply may be restored to normal operation by removing the fault that triggered the protective circuit and by momentarily actuating a normally closed reset switch. In accordance with the present invention, either the series, pass transistor or the switching transistor may be short-circuited without affecting effective protection by the protective circuit.

The novel features of the present invention, both as to its organization and methods of operation, as well as additional objects and advantages thereof, will be more readily understood from the following description, when read in connection with the accompanying drawing, in which the single FIGURE is a schematic diagram of the protective circuit of the present invention associated with the regulating circuit of a regulated, transistorized power supply.

Referring, now, to the drawing, there is shown a pair of negative and positive input terminals 10 and 12, respectively, for applying a source (not shown) of unregulated voltage to be regulated. A regulated and protected output voltage is provided between a pair of negative and positive output terminals 14 and 16, respectively, for application to a load 18, illustrated schematically as a resistor connected between the output terminals 14 and 16.

The regulating circuit may be of more or less conventional form and, as illustrated, comprises a variable impedance device, such as a series, pass transistor 20, two driver transistors 22 and 24, an amplifier 26, a sampling resistor 28, and associated circuitry. The transistors 20, 22, and 24 are of the PNP type. The sampling resistor 28 is connected between the output terminals 14 and 16. One input terminal of the amplifier 26 is connected to a tap on the sampling resistor 28, and the other input terminal of the amplifier is connected to the positive output terminal 16 through a Zener reference diode 30. One output terminal of the amplifier 26 is connected to the negative output terminal 14, and the other output terminal of the amplifier is connected to the base of the driver transistor 24. The emitter of the series, pass transistor 20 is connected to the negative output terminal 14 through a resistor 32, and the collector of the transistor 20 is connected to the negative input terminal 10 through a series circuit comprising a resistor 34, the emitter-collector current path of a variable, impedance device, such as a switching PNP transistor 36, and a resistor 38, in the order named.

The emitter of the driver transistor 22 is connected directly to the base of the transistor 20 and to a terminal 40 through a resistor 42, and the collector of the transistor 22 is connected to the emitter of the switching transistor 36 through a resistor 44. The emitter of the driver transistor 24 is connected directly to the base of the transistor 22 and to the terminal 40 through a resistor 46, and the collector of the transistor 24 is connected to the emitter of the switching transistor 36.

The positive input terminal 12 is connected directly to the positive output terminal 16. A source (not shown) of positive voltage is connected to the terminal 40. While only one series, pass transistor is shown and described herein, it will be understood that a plurality of series, pass transistors, connected in parallel, may be used, depending upon the current capacity of the power supply.

The regulating circuit operates as follows: A sample of the output voltage, from the sampling resistor 28, is compared with the voltage across the Zener diode 30, to produce an error voltage at the output of the amplifier 26. This error voltage is applied degeneratively to the base electrode of the series, pass transistor 20 via the driver transistors 24 and 22, to control the impedance of the transistor 20, and thereby to regulate the voltage applied to the load 18, in a manner well known in the art.

The protective circuit comprises, in part, the switching transistor 36, PNP driver transistors 48 and 50, a diode 51, a PNP control transistor 52, and the circuitry associated therewith. The emitter of the driver transistor 48 is connected directly to the base of the switching transistor 36 and to the terminal 40 through a resistor 54, and the collector of the transistor 48 is connected to the negative input terminal 10 through a resistor 56. The emitter of the transistor 50 is connected directly to the base of the transistor 48 and to the terminal 40 through a resistor 58, and the collector of the transistor 50 is connected to the negative input terminal 10 through a resistor 60. The base of the transistor 50 is connected, through serially connected resistors 64 and 66, to a terminal 62 from which a negative bias voltage is applied to the base of the transistor 50. The base electrode of the driver transistor 24 is connected through a resistor 70 to a terminal 68 from which a negative bias voltage is applied to the base of the transistor 24.

An independent source of voltage is applied between a voltage terminal 72 and the output terminal 16. The terminal 72 is positive with respect to the terminal 16. A voltage divider, comprising serially connected resistors 74, 76 and 78, is connected between the terminal 72 and the output terminal 16. The terminal 72 is also connected to the negative terminal 14 through a voltage divider comprising serially connected resistors 80, 82 and 84.

The switching transistor 36 and the driving transistors 48 and 50 therefor, and the series, pass transistor 20 and the driving transistors 22 and 24 therefor are biased normally in a forward direction to conduct current during the normal operation of the power supply.

In accordance with the present invention, means are provided to reverse bias the switching transistor 36, via the driver transistors 48 and 50, and the series, pass transistor 20, via the driving transistors 22 and 24, from the aforementioned independent source of voltage, upon the occurrence of a short-circuit in the load, whereby, in effect, to open the circuit between the negative input terminal 10 and the negative output terminal 14. To this end, the base (that is, the control electrode) of the control transistor 52 is connected to a tap on the resistor 76, and the collector (that is, the output electrode) of the transistor 52 is connected to the base of the driver transistor 50 through the resistor 66. The emitter (in this instance, the input electrode) of the transistor 52 is connected to a tap on the resistor 82 through a normally closed, reset switch 86 and a resistor 88. The taps on the resistors 76 and 82 are adjusted to reverse bias the control transistor 52 for normal operating conditions of the regulating circuit.

A pair of transistors 90 and 92 are connected in circuit with the control transistor 52 to maintain the control transistor 52 conductive when the latter is triggered on. The transistor 90 is an NPN type, and the transistor 92 is a PNP type. The emitter of the transistor 90 is connected to the junction between the switch 86 and the resistor 88, and the collector of the transistor 90 is connected to the terminal 72 through serially connected resistors 93 and 94. The base of the transistor 90 is connected to the tap on the resistor 82 through a resistor 96, and to the negative output terminal 14 through a resistor 98. The emitter of the transistor 92 is connected to the terminal 72, and the collector of the transistor 92 is connected to the tap on the resistor 82 through a resistor 100. The base of the transistor 92 is connected directly to the junction of the resistors 93 and 94, and also to a terminal 102 through a resistor 104. A source (not shown) of voltage is connected between the terminal 102 and the terminal 16, the terminal 102 being more positive than the terminal 16. The independent power supply between the terminal 72 and the output terminal 16 is shunted by a capacitor 106 to prevent triggering of the protective circuit when the power supply is turned on initially.

Means are also provided to bias the normally cut-off control transistor 52 into conduction upon the occurrence of an overvoltage on the load 18. To this end, an NPN transistor 108 has its emitter connected to the negative output terminal 14 through a normally non-conducting Zener diode 110, and its collector is connected to the base of the transistor 92 through a resistor 112. The base of the transistor 108 is also connected to the tap on the resistor 82 through a resistor 114. The emitter of the transistor 108 is also connected to the terminal 72 through a resistor 116. The transistor 108 is prevented from being triggered by transients by connecting its emitter to the positive output terminal 16 through a capacitor 118.

The common junction of the resistors 64 and 66 is connected to the base of the driver transistor 24 through the diode 51, the latter being poled in a direction to conduct conventional current to the base of the driver transistor 24. Under normal operating conditions of the power supply, the bias voltages supplied to the terminals 62 and 68 are sufficient to reverse bias the diode 51. Upon the occurrence of a fault, however, the diode 51 is made conductive, as will hereinafter be explained.

The operation of the protective circuit of the present invention will now be described. Let it be assumed that there is a short-circuit in the load 18, so that the output terminals 14 and 16 are substantially short-circuited. Under these conditions, the voltage between the output terminals 14 and 16 decreases, and the emitter of the control transistor 52 becomes positive with respect to the base. This action causes the control transistor 52 to become conductive and to apply a positive voltage from the tap on the resistor 76 to the base of the switching transistor 36 through the driver transistors 48 and 50, and to the base of the series, pass transistor 20 through the driver transistors 22 and 24 and the diode 51.

A positive voltage on the base electrode of the switching transistor 36 and on the base electrode of the series, pass transistor 20 reverse biases these transistors, causing them to cease conduction and to function effectively as an open switch. When the control transistor 52 is made conductive, the normally cut-off transistors 90 and 92 are also made conductive, by a lowering of the voltage at the tap on the resistor 82, and they are driven to saturation, thereby sending current through the emitter-collector current path of the control transistor 52 and aiding to maintain the control transistor 52 in a conducting state.

The voltage at the tap on the resistor 76, applied to the anode of the diode 51 through the control transistor 52, is sufficient to overcome the negative bias at the junction of the resistors 64 and 66, thereby causing the diode 51 to conduct. By means of this action, both the switching transistor 36 and the series, pass transistor 20 may be reverse biased upon the occurrence of a fault. Since the short-circuiting of the emitter-collector path in the series, pass transistor 20 and/or the driver transistors may occur at random, the load and the power supply may still be protected because the reverse biasing of the switching transistor 36 alone will effectively prevent any current from flowing to the load. The transistors of a transistorized power supply are protected by this action because they are rendered inoperative when the switching transistor 36 is reverse biased.

Let it now be assumed that there is a tendency for the voltage across the load 18 to increase suddenly, due, for example, to a fault in the regulating circuit. The breakdown voltage of the Zener diode 110 is such that the diode 110 conducts only after a predetermined rise in the output voltage between the output terminals 14 and 16. When the Zener diode 110 conducts, the emitter of the transistor 108 goes negative at a greater rate than the base of the transistor 108, and the normally cut-off transistors 108 and 92 are rendered conductive. Current through the transistor 92 causes the transistors 90 and 52 to become conductive also, thereby applying a positive bias from the tap on the resistor 76, through the control transistor 52, to the bases of the switching transistor 36 and the series, pass transistor 20. This action reverse biases the serially connected transistors 36 and 20, and causes each of them to function as an open switch. It will be understood that a short circuit in either the switching transistor 36 and/or its driver transistors 48 and 50 or in the series, pass transistor 20 and/or its driver transistors 22 and 24 still causes the protective circuit to cut off current to the load because either one of these serially connected transistors may be reverse biased to obtain effective protection. Thus, by providing means to interrupt current in a circuit in either, or both, of two points, the reliability of protection provided by the present invention is increased.

After the fault has been removed, the power supply and the protective circuit may be returned to normal operation by momenttffarily opening and closing the normally closed, reset switch 86. Merely removing the fault without opening and closing the reset switch does not restore the power supply to normal operation because the control transistor 52 is energized from an independent source of voltage.

From the foregoing description, it will be apparent that there has been provided an improved protective circuit wherein current to a load may be interrupted upon the occurrence of a short-circuit in the load, or upon the occurrence of an overvoltage applied to the load, even though the series, pass transistor of the regulating circuit and/or its driver transistors may be short-circuited. The value of the components indicated on the diagram are merely illustrative of one embodiment of the protective circuit, in accordance with the present invention, in a regulated power supply adapted to provide an output of 12 volts with a current load of as high as 10 amperes. While only one embodiment of this invention has been illustrated, variations of the protective circuit coming within the spirit of this invention will, no doubt, readily suggest themselves to those skilled in the art. For example, by reversing the polarities of all voltages and reversing the Zener diodes, each PNP transistor can be replaced by an NPN transistor and each NPN transistor can be replaced by a PNP transistor. Hence, it is desired that the foregoing description of the invention shall be considered merely as illustrative and not in a limiting sense.

What is claimed is:

1. In a power supply of the type wherein a first source of voltage is applied through a variable impedance device to a pair of output terminals to provide an outut voltage and current for a load, a protective circuit comprising a switching device connected in series with said variable impedance device and said first source, a control transistor, each of said devices including a separate control electrode, means including a voltage terminal for connecting a second source of voltage to said output terminals, means connecting the input electrode-output electrode current path of said transistor between each of said control electrodes and said last-mentioned means, means connecting a control electrode of said transistor to said voltage terminal to cut off conduction through said transistor when said output voltage is within a predetermined range of voltages and to cause said transistor to conduct when said output terminals are substantially short-circuited, and means connected between one of said pair of output terminals and said input electrode-output electrode current path to cause said transistor to conduct when said output voltage is greater than a predetermined voltage whereby to apply a voltage from said second source to said control electrodes of said devices to cause them to cease conducting.

2. In a power supply of the type wherein a first source of voltage is applied through a first variable impedance device to a pair of output terminals to provide an output voltage and current for a load, a protective circuit comprising a second variable impedance device connected in series with said first device and said first source, a control transistor, each of said devices including a separate control electrode, means including a voltage divider and a voltage terminal for connecting a second source of voltage to said output terminals, means including a diode connected between said control electrodes, means including said diode and said last-mentioned means connecting the input electrode-output electrode current path of said transistor between each of said control electrodes and said voltage divider, means connecting a control electrode of said transistor to said voltage terminal of said second source to cut off conduction through said transistor when said output voltage is within a predetermined range of normal output voltages and to cause said transistor to conduct when said output terminals are substantially short-circuited, means connected between one of said pair of output terminals and said input electrode-output electrode current path to cause said transistor to conduct when said output voltage is greater than a predetermined voltage, and means reverse biasing said diode when conduction is cut off through said transistor, said first and said second devices being reverse biased when said control transistor conducts.

3. In a power supply wherein a first source of voltage is applied through two serially connected transistors to a pair of output terminals to provide an output voltage and current for a load, a control transistor, each of said transistors including a control electrode, means including a voltage terminal for connecting a second source of voltage to said output terminals, means connecting the input electrode-output electrode current path of said control transisor between said last-menioned means and each of said conrol electrodes of said serially connected transistors, means connecting said control electrode of said control transistor to said voltage terminal of said second source to maintain said control transistor cut off when said output voltage for said load is within a predetermined range of voltages and to cause said control transistor to saturate when said output terminals are substantially short-circuited, and means connected between one of said pair of output terminals and said current path of said control transistor to cause said control transistor to conduct and to reverse bias said serially connected transistors when said output voltage is greater than the highest voltage in said predetermined range of voltages.

4. In a power supply wherein a first source of voltage is applied through two serially connected transistors to a pair of output terminals to provide an output voltage for a load, a control transistor, each of said transistors including a control electrode, a second source of voltage, means including a voltage divider connecting said second source to said output terminals, a diode, means connecting said diode between said control electrodes of said serially connected transistors, means including said diode and said last-mentioned means connecting the input electrode-output electrode current path of said control transistor between said voltage divider and each of said control electrodes of said serially connected transistors, means connecting said control electrode of said control transistor to said second source to maintain said control transistor cut off when said output voltage for said load is within a predetermined range of voltages and to cause said control transistor to saturate when said output terminals are substantially short-circuited, a Zener diode, and means connecting said Zener diode between one of said output terminals and said current path of said control transistor to cause said control transistor to conduct and to reverse bias at least one of said serially connected transistors.

5. In a power supply of the type wherein a source of unregulated voltage is applied to a pair of input terminals of a regulated circuit, wherein a regulated output voltage for a load is derived between a pair of output terminals of said regulating circuit, and wherein a sample of said output voltage is fed back degeneratively to a control electrode of a first variable impedance device connected in series between one of said input terminals and one of said output terminals to control the impedance of said first device in accordance with variations in said output voltage; a protective circuit comprising a second variable impedance device connected in series with said first variable impedance device, said second device having a control electrode, means including a voltage terminal for a second source of unidirectional voltage, means including a voltage divider connecting said voltage terminal to said pair of output terminals, a control transistor, means connecting the emitter-collector current path of said transistor between said voltage divider and each of said control electrodes of said devices, means connecting the base electrode of said transistor to said voltage terminal of said second source of voltage to bias said transistor to cut off during normal operation of said power supply, and means to apply a voltage from said second source through said control transistor to said control electrodes to reverse bias said devices when said output voltage falls below a fixed predetermined amount, said last-mentioned means comprising a diode and means connecting said diode between said control electrodes.

6. In a power supply of the type wherein a source of unregulated unidirectional voltage is applied to a pair of input terminals of a regulating circuit, wherein a regulated output voltage for a load is derived between a pair of output terminals of said circuit, and wherein a sample of said output voltage is fed back degeneratively to a base electrode of a series, pass transistor whose collector-emitter path is connected between one of said input terminals and one of said output terminals for variation of the impedance of said series, pass transistor in accordance with variations in said output voltage; a switching transistor having an emitter-collector current path connected in series with said emitter-collector path of said series, pass transistor, means comprising a control transistor for reverse biasing said series, pass transistor and said switching transistor in the event of an abnormal output voltage between said output terminals, means including a voltage terminal to apply an independent source of voltage to said power supply, means including said voltage terminal of said independent source of voltage to bias the base electrode of said control transistor with a voltage that normally drives said series, pass transistor to cut off, means connecting the emitter-collector current path of said control transistor between said one of said output terminals and said base electrode of said series, pass transistor, said last-mentioned means comprising means to cause said control transistor to be cut off during normal output voltages of said power supply and to be conducitve when said output voltage exceeds a predetermined amplitude.

7. Protective means to interrupt current in a circuit energized by a first source of voltage upon the occurrence of an overvoltage in said circuit, said protective means comprising a switching device having an input electrode-output electrode current path connected in series with said circuit, said device including a control electrode to control current therethrough, means including a voltage terminal to provide a second source of voltage, a control device having an input electrode-output electrode current path and a control electrode therefor, a voltage divider, means including said voltage divider connecting said voltage terminal of said second source of voltage to said circuit, means connecting said current path of said control device in series with a tap on said voltage divider and said control electrode of said switching device, means connecting said control electrode of said control device to said voltage terminal of said second source of voltage to reverse bias said control device during normal operation of said circuit, a Zener diode, and means connecting said Zener diode to said current path of said control device to cause said Zener diode to become conductive only upon the occurrence of an overvoltage in said circuit and to cause said control device to become conductive to apply a voltage from said second source to said control electrode of said switching device, whereby to cause said switching device to become reverse biased and to function as an open switch.

References Cited in the file of this patent
UNITED STATES PATENTS
2,922,945   Norris et al. _____ Jan. 26, 1960